United States Patent
McBrearty et al.

(10) Patent No.: US 6,216,211 B1
(45) Date of Patent: Apr. 10, 2001

(54) METHOD AND APPARATUS FOR ACCESSING MIRRORED LOGICAL VOLUMES

(75) Inventors: Gerald Francis McBrearty; Johnny Meng-Han Shieh, both of Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/874,531

(22) Filed: Jun. 13, 1997

(51) Int. Cl.[7] ................................................ G06F 13/00
(52) U.S. Cl. ............................ 711/162; 711/163; 711/167
(58) Field of Search ................................ 711/1, 162, 112, 711/114, 163, 167; 395/821; 707/205

(56) References Cited

U.S. PATENT DOCUMENTS

| | | | |
|---|---|---|---|
| 5,129,088 | * 7/1992 | Auslander et al. | 711/1 |
| 5,212,784 | * 5/1993 | Sparks | 714/6 |
| 5,276,867 | 1/1994 | Kenley et al. | 395/600 |
| 5,403,639 | 4/1995 | Belsen et al. | 395/600 |
| 5,435,004 | * 7/1995 | Cox et al. | 711/112 |
| 5,515,502 | 5/1996 | Wood | 395/182.13 |
| 5,519,844 | 5/1996 | Stallmo | 395/441 |
| 5,761,526 | * 6/1998 | Sakakura et al. | 711/114 |
| 5,819,310 | * 10/1998 | Vishlitzky et al. | 711/114 |
| 5,845,295 | * 12/1998 | Houseman et al. | 711/4 |

* cited by examiner

Primary Examiner—John W. Cabeca
Assistant Examiner—Fred F. Tzeng
(74) Attorney, Agent, or Firm—Andrea P. Bryant; Leslie A. Van Leeuwen (57) ABSTRACT

A system and method for managing mirrored logical volumes are provided wherein a user designates one mirror of a given logical volume, having a first entry point, as the backup mirror, with a different entry point, for that logical volume; and thereafter, upon user issuance of an I/O command, appropriately valid mirror(s) are selected to be read from or written to as a function of which of the two entry points to the same data is specified.

5 Claims, 5 Drawing Sheets

METHOD AND APPARATUS FOR ACCESSING MIRRORED LOGICAL VOLUMES

TECHNICAL FIELD

The present invention relates to manipulation of mirrored data in a data processing system. More particularly, it relates to the provision of two entry points into a logical volume, and a method for choosing therebetween, to look at, back up or temporarily alter data without impairing normal system operation.

BACKGROUND OF THE INVENTION

Maintaining backup copies of data is necessary. The nature of any given application greatly influences the frequency with which backups must be taken. In situations where data is subject to frequent changes, backup copies are made with a frequency determined as a function of the complexity of recovery. Often, in today's real time environments, multiple copies of data are simultaneously maintained to avoid, or at least reduce, down time associated with data recovery after an incident resulting in processing interruptions. Users are interested in testing the effects of data changes without incapacitating or halting routine operations. To that end, various techniques are taught in the prior art, ranging from total duplicate systems to duplicate files to mirrored disks to mirrored logical volumes within a system.

U.S. Pat. No. 5,403,689 (Belsan et al., Apr. 4, 1995), for example, discloses a file server storage subsystem which defines, manages and accesses synchronized sets of data and maintains them external to the host system's data management facilities.

U.S. Pat. No. 5,515,502 (Wood, May 7, 1996) relates to a backup system for multiple archive devices. This is a full-blown backup system in which data that changed after backup started, are copied again.

U.S. Pat. No. 5,519,844 (Stallmo, May 21, 1996) relates to redundant array storage and physical storage units configured as one or more logical storage units.

A logical volume manager (LVM) is included in the Advanced Interactive Executive Operating System (AIX) version 4.2 from the International Business Machines Corp. Logical volumes may be used for a variety of system purposes such as file systems, paging space and raw data.

This LVM uses a hierarchy of structures to manage fixed disk storage. Each individual fixed disk, called a physical volume, has a name. Every fixed disk which is in use belongs to a volume group. Physical volumes in a volume group are divided into physical partitions of the same size. The number of physical partitions on each disk may vary as a function of the total drive capacity.

One or more logical volumes may be defined within in each volume group. Logical volumes comprise data which may be physically located on different disks. While the data in a given logical volume appears to the user to be contiguous, it may be discontiguous on the physical volume(s). Data in a logical volume may span multiple physical volumes. Logical volumes can be resized, relocated or have their contents replicated; thereby affording great flexibility within the LVM.

Each logical volume comprises one or more logical partitions, which correspond to physical partitions on the fixed disk. When mirroring is used for a logical volume, additional physical partitions are allocated for storing additional copies of each logical partition. The logical partitions are consecutively numbered, but the corresponding physical partitions are not necessarily consecutive or contiguous.

When logical volumes have mirrored copies, each mirrored partition has one of two states, available and stale. Data may be read from any available mirrored partition, but must be written to all available mirrored partitions. Only partitions which are available are allowed to be read from or written to. Stale partitions are not normally read from or written to. A particular AIX command must execute to copy data from an available mirror to a stale mirror and subsequently change the state of the stale mirror partition to available.

There are occasions, however, when users want an instant snapshot of data on a mirrored logical volume. The user may want to simply backup the data; or it may be desired to make changes to the data, run an application and evaluate the results. The user may then choose to eliminate the changes and restore the original data. Prior art techniques historically require a user who desires to revert to the original data, to first make a backup copy of the data before restoring it. These actions are time consuming.

AIX allows a user to split a mirror into a new logical volume. The user has the option of running against data on either logical volume. A drawback of this technique becomes apparent when it is desired to rejoin the split off mirror copy to the source copy. The entire logical volume must be resynchronized, regardless of the number or nature of changes made on either logical volume, an operation which may take a relatively long time.

Thus, a need arises to more efficiently manage mirrored logical volumes. It is desirable to allow users to capture snapshot data and to manipulate data in multiple mirrors independently. It is not desirable to require that an entire logical volume be resynchronized. It is still further desirable to reduce the time and system resources required to backup and restore original data as well as to make a mirror copy completely available for use.

SUMMARY OF THE INVENTION

The present invention provides such desirable advantages over the prior art by providing an improved technique for managing mirrored logical volumes. Our invention provides a system and method for manipulating multiple copies of a mirrored logical volume so that multiple semi-independent versions of the data exist. These versions of the data comprise one or more primary copies and a backup copy of a logical volume. Data common to any mirrored copy may be read from a primary copy or from the backup copy. Data unique to the backup copy is available only from the backup copy. Write operations to either a primary or to the backup cause the backup copy to lose commonality with the other mirrored copies.

We provide a technique for accessing data unique to the backup copy by allowing two different logical volumes to have access to the same logical partitions There are, these, two entry points provided. This capability is accomplished by designating one of plural copies of a mirrored logical volume as the backup copy or by passing an extension value on a read call.

Any write operations to to either entry point cause the block being written to be marked stale on the backup mirror. When that backup mirror is no longer needed, the entry point thereto is deleted and the logical volume mirrors may be resynchronized in a conventional manner in which only those blocks marked stale are resynchronized, rather than updating the entire volume.

Our invention involves a performance enhancing improvement to known mirrored data storage techniques by enabling a user to run live tests while continuing normal processing. The user determines which mirror copy of a logical volume is the backup, or static copy, and which copy is active. The user may thereafter switch these designations, thereby using less time and fewer system resources to accomplish a variety of data evaluation and test tasks.

The above and other aspects and advantages of our invention will become apparent from the following detailed description which is presented having reference to the accompanying drawings, wherein:

DETAILED DESCRIPTION OF THE PREFERRED EMBODIMENT

The present invention will be described for illustrative purposes as implemented in a particular data processing environment, but those skilled in the art will appreciate that our system and method may be adapted to other hardware, software and operating system configurations.

Figure 1:
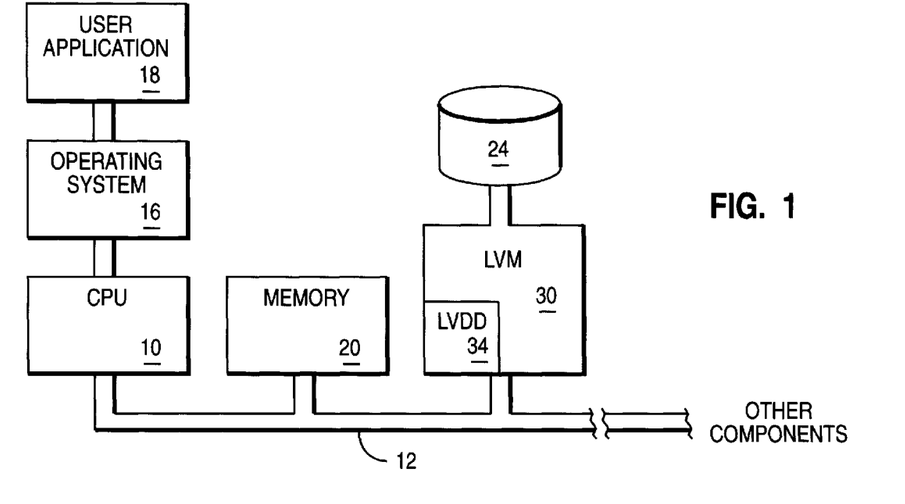
FIG. 1 is a block diagram of a data processing system including a central processing unit in which the present invention may be carried out.

FIG. 1 shows a typical data processing system within which the present invention may be implemented, such as the IBM RISC System 6000 series of systems. A central processing unit (CPU) 10, such as a POWER PC 604, available from International Business Machines Corporation, is provided and interconnected to other system components via system bus 12. An operating system 16 runs on CPU 10 and provides control and is used to coordinate the functions of the various components of FIG. 1. Operating system 16, in this exemplary embodiment, is AIX v. 4.2, a UNIX based operating system, available from International Business Machines Corporation. Attention is directed to a library of technical publications pertaining to AIX such as AIX Version 4 System Management Guide: Operating System and Devices, order number SC23-2525; AIX Version 4 Kernel Extensions and Device Support Programming Concepts, order number SC23-2611; AIX Version 4 Technical Reference, Volumes 1 and 2: Base, order numbers SC23-2614 and SC23-2615, Operating System and Extensions; and AIX Version 4 Technical Reference, Volumes 5 and 6: Kernel and Subsystems, order numbers SC23-2618 and SC23-2619.

A user application interface is indicated at 18. All appropriate and necessary hardware and software for a user to interact with the data processing system is assumed to be included in the data processing system of FIG. 1. Memory 20 is provided and interconnected with operating system 16, user interface 18, disk storage subsystem 24 and LVM 30. LVM 30 includes a logical volume device driver (LVDD) 34 the purpose of which will become clear as this description proceeds.

Figure 2:
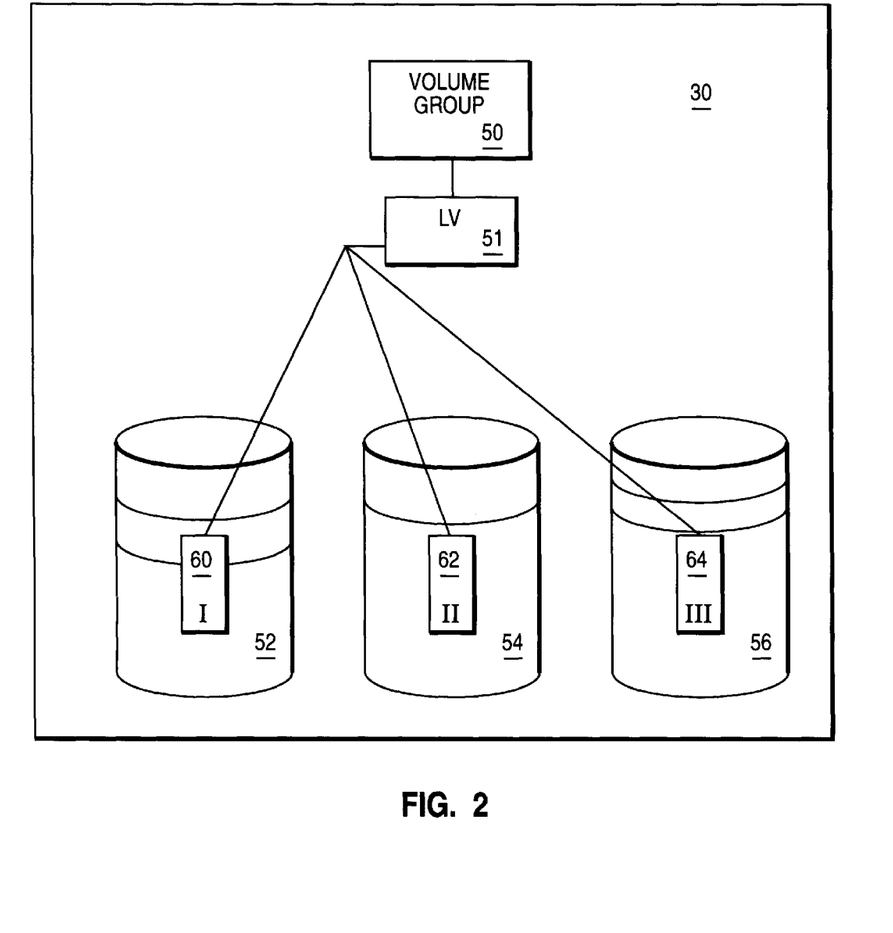
FIG. 2 is a graphic representation of logical volumes managed according to the present invention.

Refer now to FIG. 2 which graphically represents aspects of disk storage subsystem 24 and LVM 30, FIG. 1. In LVM 30 in which our invention is used, up to three mirrors may be defined and such a set up is known as a triple mirrored system. Volume group 50 includes three disks 52, 54 and 56. As is understood in the art, logical volumes reside only in volume groups and individual logical volumes may span multiple disks within a volume group. Each physical volume within a volume group is uniquely identified.

A logical volume comprises logical partitions correlated to physical partitions on the devices making up the volume group. A volume group is identified by a major number, and each logical volume within the volume group is identified to LVDD 34 in LVM 30 by a minor number. Within this description minor number and entry point are used interchangeably. The minor number is used to distinguish among devices supported by the same LVDD. A minor number typically serves as an index into an array, maintained by the driver, of structures containing device specific information.

Logical volume 51 is triply mirrored. Mirrors 60, 62 and 64 are copies of logical volume 51, physically residing on disks 52, 54 and 56. In accordance with the present invention, a user may designate one of these three copies, 60, 62 and 64, to be the backup or static copy which is unchanged during ordinary I/O operations.

For ease of understanding the more detailed explanation of our selection process which follows, mirror copies 60, 62 and 64 will be referenced as mirrors I, II and III, respectively.

Figure 3:
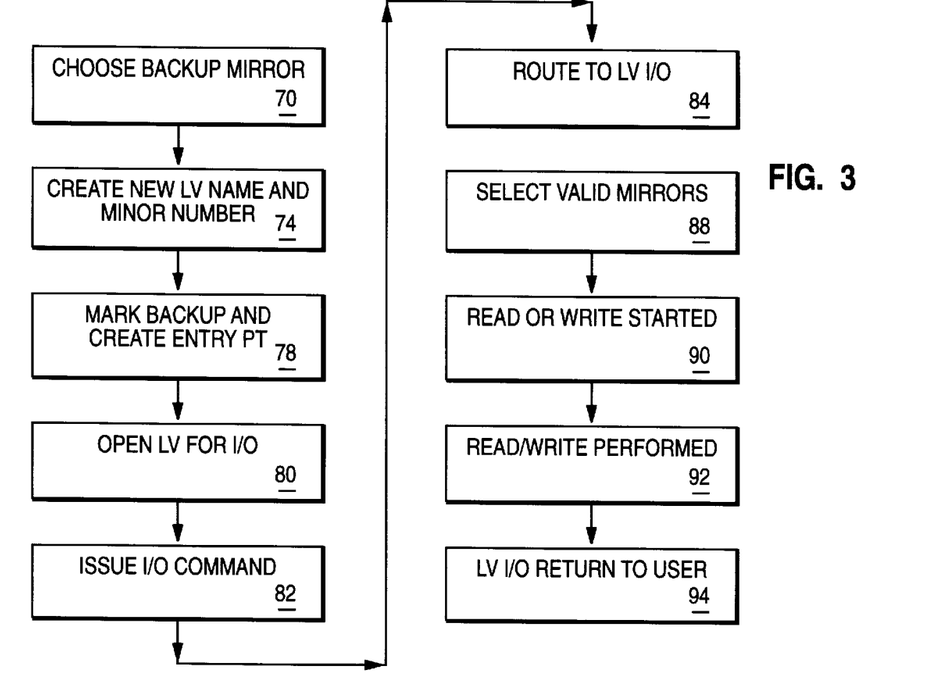
FIG. 3. is a high level flowchart including the present invention.

FIG. 3 shows the principal steps used in carrying out the present invention in an LVM environment. The description of FIG. 3 has reference to the preceding FIGS. 1 and 2. At step 70 a user of the data processing system of FIG. 1 designates one of the three mirrors (60, 62, 64) of logical volume 51, FIG. 2, as a backup. Performing this designation entails input from a user at user interface 18 causing LVM 30 to set an indicator for the designated mirror in memory 20 of FIG. 1. The user may change the backup copy designation at his or her discretion by repeating step 70, thereby generating a new minor (entry point) number through which to access the backup copy in subsequent runs. LVM 30 also permits the user to choose one of two backup designation modes. They are persistent and non persistent; the difference being that in the first mode backup status remains even after the data processing system is rebooted.

At step 74 LVM 30 creates a new logical volume (LV) name and entry point, minor number. This new entry point points to the same data as the original entry point. In order to subsequently access the data unique to the designated backup mirror, the new minor number is used. At step 78, the designated backup mirror is marked as such, and a new device entry point is created using the minor number just created in step 74. LVVD 24, FIG. 1, is a pseudo device driver which operates on logical volumes through a special file such as /dev/ln[n]. Like a physical disk device driver, LVDD 34 provides character and block entry points with compatible arguments.

AIX, like any UNIX system, makes I/O to a device look like I/O to a file in the system directory tree. A given device is prepared for I/O by having its corresponding file opened. The I/O is carried out by invoking read/write system calls on the corresponding file. The device is free for access by other software by closing the device special file associated with the device. Since device specific data is kept in the inode of a device special file, the need for passing device specific parameters to system calls is avoided, and the same device interface can be used by any application accessing different devices.

Each volume group has an entry in the kernel device switch table which resides in memory 20 and is used by operating system 16. Each volume group entry contains entry points for the device driver and a pointer to the volume group data structure. Logical volumes in a volume group are distinguished by their minor numbers.

Some UNIX systems contain separate device switch tables for character and block drivers. A flag c or b is required to make the distinction. Some UNIX systems access stream heads through a third device switch table. Our invention exploits the AIX feature which provides for invoking the entry points to character (c) and block (b) drivers and stream heads through a single device switch table.

Character I/O requests are performed by issuing a read or write request on a /dev/rlv[N] character special file for a logical volume. The read or write is processed by the file system supervisory call (SVC) handler in memory 20, which calls the LVDD 34 ddread or ddwrite entry point. The ddread or ddwrite entry point transforms the character request into a block request by building a buffer for the request and then calling the LVDD 34 ddstrategy entry point.

Block I/O requests are performed by issuing a read or write on a block special file such as /dev/lv00. These requests go through the SVC handler to the bread or bwrite block I/O kernel services. These services build buffers for the request and call the LVDD 34 ddstrategy entry point. The LVDD ddstrategy entry point then translates the logical volume address to a physical volume address, which translation includes handling bad block relocation and mirroring. Then the LVDD ddstrategy entry point calls the appropriate physical device driver.

On completion of the I/O operation, the physical disk device driver calls the iodone kernel service on the device interrupt level. The iodone kernel service calls the LVDD 34 I/O completion handling routine which is also included in LVM 30. When this routine completes its action, LVDD 34 calls the iodone service again to notify the user that the I/O operation is finished.

At step 80 a user process at user interface 18, FIG. 1, opens a logical volume. Then, at step 82 an I/O command is issued by the process for the logical volume. The entry point to the logical volume is specified to be either that of the backup or that of a non backup mirrored logical volume. Step 84 represents a kernel syscall read/write routine routing the I/O request to the logical volume and its associated read/write routine. Then the logical volume read/write routine implementing the method of the present invention is utilized at step 88 to select the valid mirror(s) on which the I/O operation will take place. The selection step will be better understood having reference to the following flowcharts of FIGS. 4 through 7. Once selection occurs at step 88, the I/O operation can be completed using the list of valid mirror(s) assembled by our selection process. At step 90 the logical volume I/O picks from the list of valid mirror(s) and starts the read/write to the selected logical volume mirror. The accomplishment of the physical disk read/write is indicated at step 92, and control is returned to the LVDD 34 I/O routine which then returns at step 94 the result of the I/O to the user.

Figure 4:
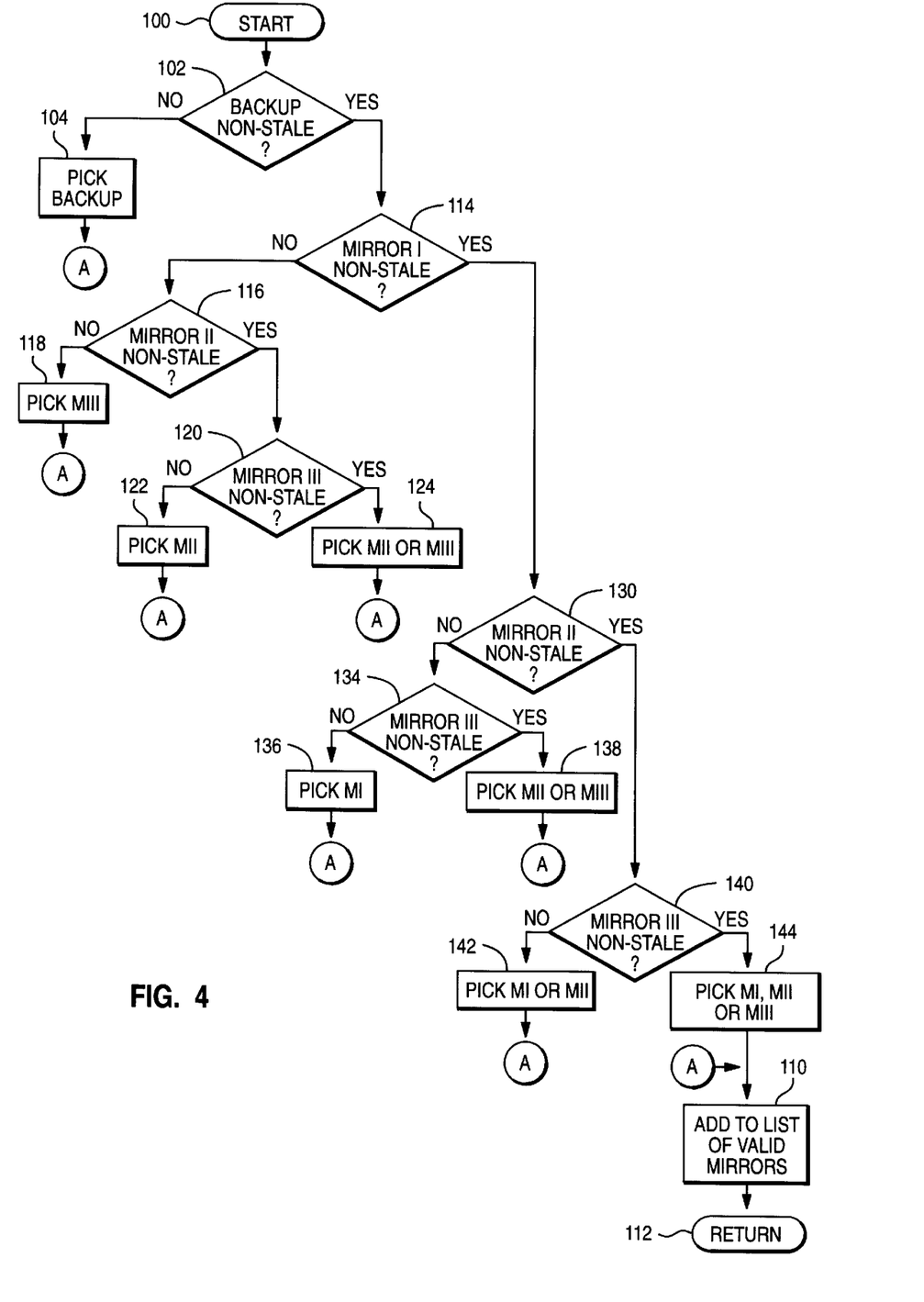
FIG. 4 is a flowchart of the logic followed when selecting valid mirror(s) when a read operation uses the entry point of the user designated backup mirror.

FIG. 4 illustrates the logic executed in the case where the user has indicated that the entry point to the backup mirrored logical volume is to be used for a read.

As the logic of the flowchart of FIG. 4 is entered at terminal 100, a determination is made at step 102 whether the backup mirrored logical volume(nn, FIG. 2) is non stale, i.e., active. If not, the backup is selected at 104 and added, at step 110, to the list of valid mirrors to be returned at 112 to the logical volume I/O routine. If the designated backup is non stale, then at step 114, the stale indicator associated with mirror I is checked. If mirror I is active, then the same determination is made for mirror II at step 116. If mirror II is not active, then mirror III is picked at step 118 and added to the list of valid mirrors. If mirror II is found to be active at step 116, mirror II is checked for that attribute at step 120. If mirror III is not active, then mirror II is picked at step 122 and added to the list of valid mirrors. If mirror III was found at 120 to be active, then either of mirrors II and III is selected at step 124 to be added to the list of valid mirrors.

If mirror I was found to be active at step 114, then at step 130, mirror II is examined. If mirror II is not active, then at step 134, mirror III is tested. If mirror III is not active, then mirror I is selected at step 136 and added to the list of valid mirrors. If mirror III was found to be active at test 134, then at step 138 mirror I or mirror III is selected and added to the list of valid mirrors.

When mirror II is found to be active at test 130, mirror III is next tested at step 140. If mirror III is not active, then a selection is made at step 142 of mirrors I or II to be added to the list of valid mirrors. If mirror III is determined to be active at step 140; mirror I, II or III is selected at step 144 to be added to the list of valid mirrors.

Figure 5:
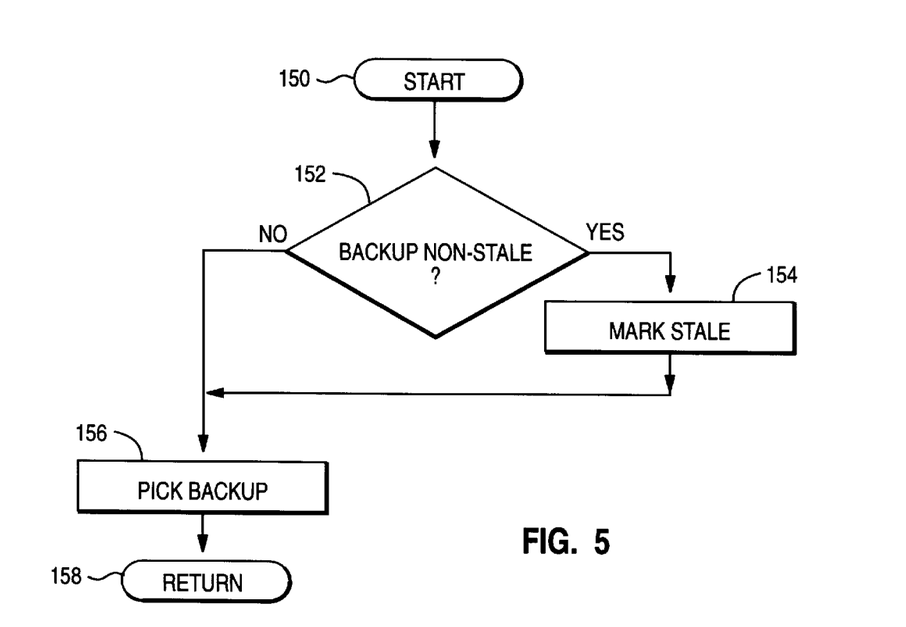
FIG. 5 is a flowchart depicting logic for selecting for a mirror to be written when a write is issued using the entry point of the user designated backup.

FIG. 5 shows the selection logic used when a write operation is initiated using the entry point associated the user designated backup mirrored logical volume. This procedure is used in that aspect of our invention that permits temporary changes to be made to data in a logical volume for test purposes or the like without causing interference with production processing. Every write causes the receiving block on the backup mirror to be marked stale. Thus, after entering this part of our selection logic at terminal 150, the backup logical volume is checked at test 152 to see if it is active. If so, it is marked stale at step 154. For either result of test 152, the designated backup is selected at step 156 and returned at 158 to the logical volume I/O routine for completion of the write operation.

Figure 6:
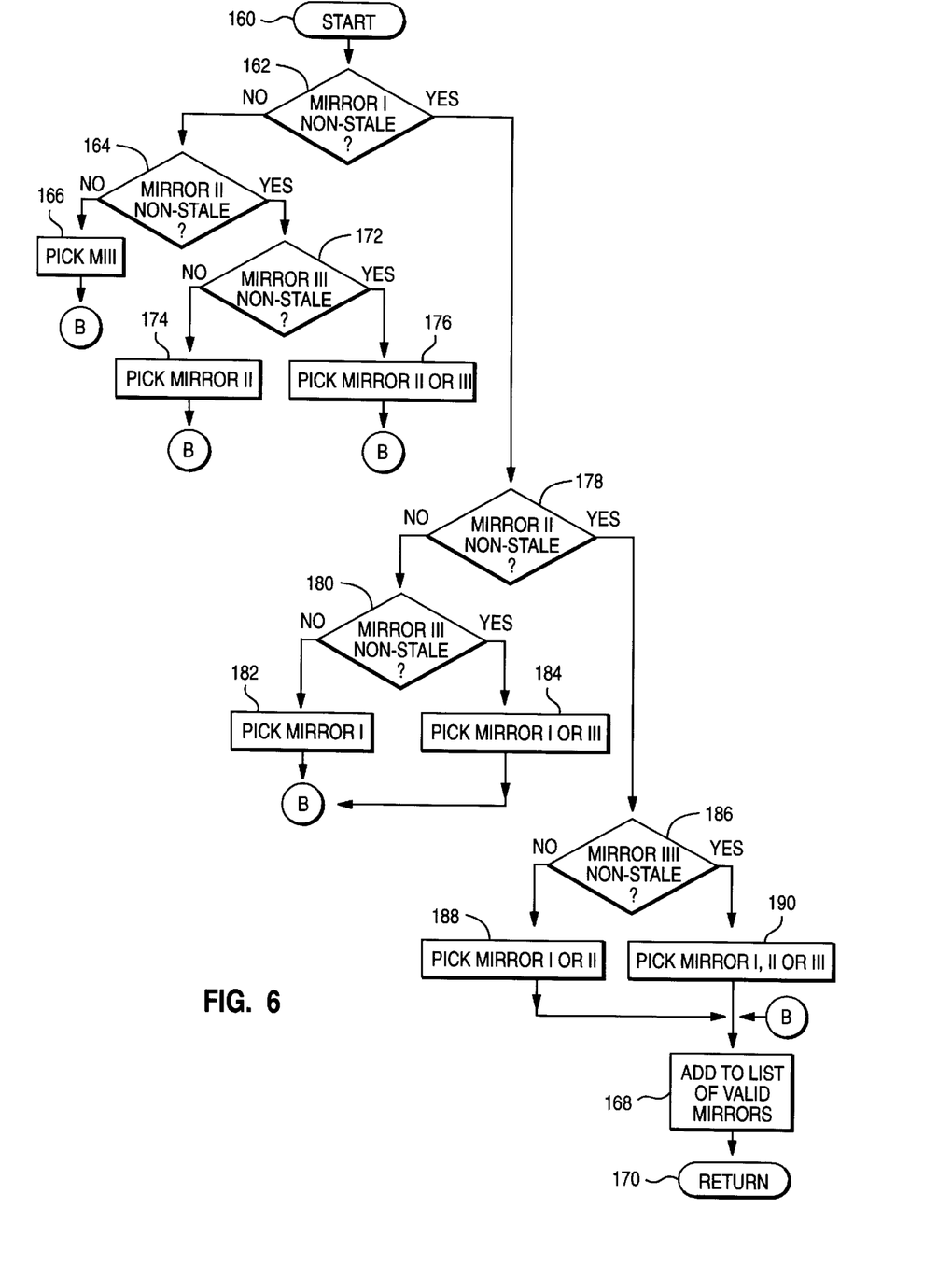
FIG. 6 is a flowchart showing the logic used in selecting valid mirrors when a read is issued using the entry point of a primary mirror.

We will now describe our selection technique for those I/O operations which are initiated through the primary entry point to a mirrored logical volume managed in accordance with the present invention. Refer now to FIG. 6 which shows our selection process for a read and begins at terminal 160. Mirror I is checked at step 162 to ascertain whether it is not stale, i.e., active. If not, the same characteristic is checked for mirror II at test 164. If mirror II is not available, then mirror III is selected at step 166 and added to the list of valid mirrors at step 168. That list is returned at 170 to the logical volume I/O routine, to enable completion of the read.

If mirror II is found to be available at 164, the availability of mirror III is determined at test 172. If mirror III is not available, then mirror II is selected at 174, and added to the valid mirror list. If, however, mirror III is found to be available at test 172, then either of mirrors II or III is appropriate to be read. So at step 176 both are added to the valid mirror list from which the logical volume I/O routine may use either to complete the read request.

When mirror I is found to be available at test 162, we next check the availability of mirror II at 178. If mirror II is stale, the status of mirror III is checked at 180. If mirror III is stale, then mirror I is selected at 182 and added to the valid mirror list; but if mirror II is found to be available at test 180, either of mirrors I or III can be selected at step 184. Both are placed on the valid mirror list, and the final pick is made by the logical volume I/O routine.

If mirror II was determined to be available at test 178, the status of mirror III is checked at step 186. If mirror III is found to be stale, either of mirrors I or II is suitable to be read so both are selected at step 188 to be placed on the valid mirror list. When test 186 finds that mirror III is available, step 190 selects any one of the three mirrors as available. Then all three are placed on the valid mirror list to be returned to the logical volume I/O routine.

Figure 7:
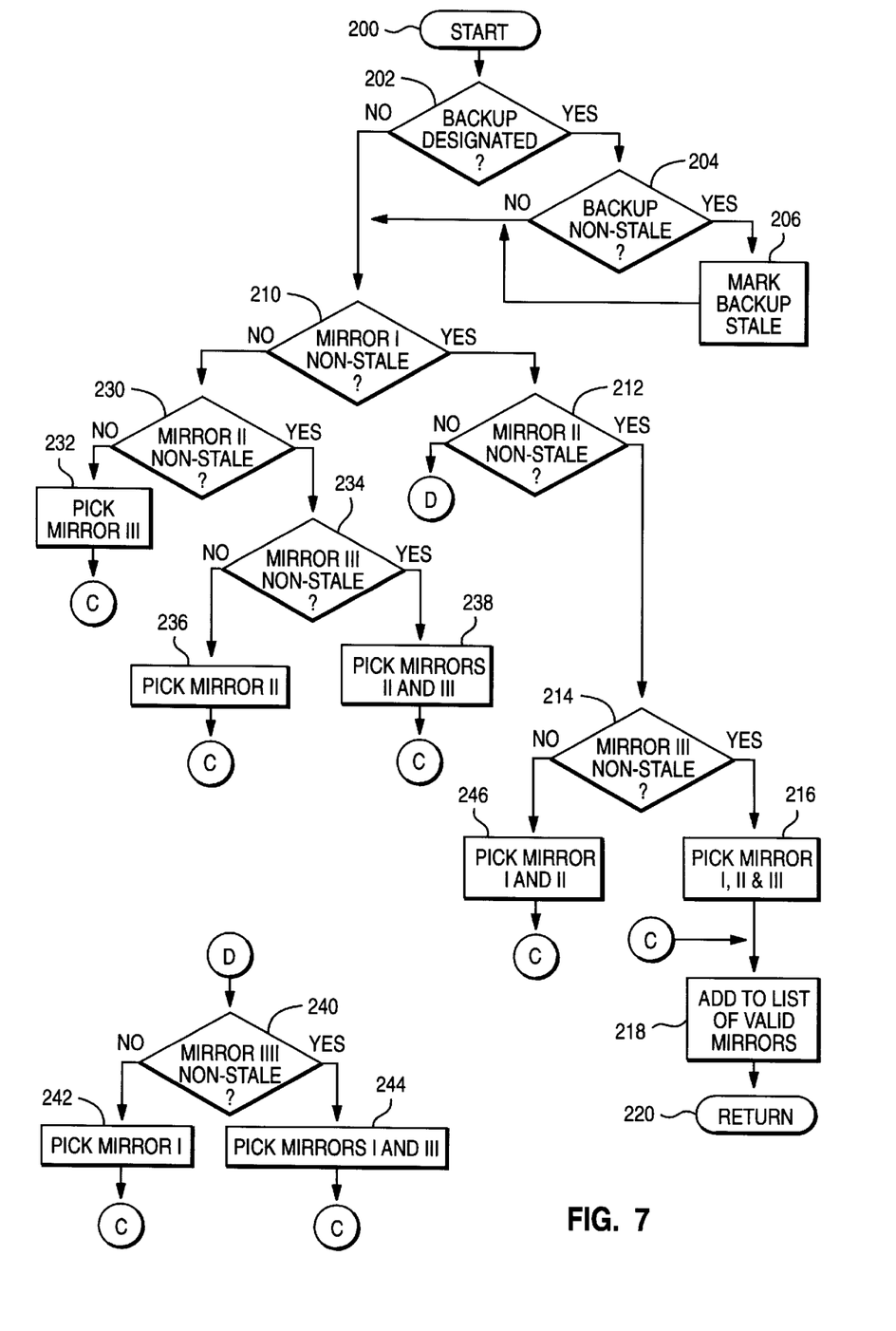
FIG. 7 is a flowchart of logic for selection of valid mirrors when a write is issued through the entry point associated with a primary mirror.

FIG. 7 shows our selection process for writes to primary mirror(s), i.e. the mirrored logical volume copy(ies) other than the one the user has designated as the backup mirror. The first event after entering this part of our logic at 200 is to establish at test 202 whether there is a user designated backup mirror. If so, the status of the backup is determined at step 204. If there is a backup and it is not stale, then at step 206 it is marked stale. In any event, mirror I status is then checked at test 210. If mirror I is available, the status of mirror II is checked at step 212; and if so the status of mirror III is found at test 214. If mirror III is available, then all three are selected at 216 for placement on the valid mirror list and returned to the logical volume I/O routine.

When mirror I is stale, the status of mirror II is queried at step 230. If mirror II is found to be stale, mirror III is selected at step 232 and added to the list of valid mirrors. If, however, mirror II is determined to be available at test 230, the availability of mirror III is tested at step 234. When mirror III is stale, mirror II is selected at step 236 to be placed on the valid mirror list. When test 234 finds mirror III to be available, both mirrors II and III are selected at 238 to be placed on valid mirror list.

When tests 210 and 212 determine that mirror I is available but mirror II is stale, the status of mirror III is then tested at step 240. Thus, when mirror III is also stale, only mirror I is selected at 242 to be passed to the valid mirror list. When mirror I is available, mirror II is not, and test 240 determines that mirror III is available; mirrors I and III are selected at 244 to go on the valid mirror list. When test 214 results in finding that mirror III is stale, mirrors I and II are selected at 246 to be included in the valid mirror list.

In operation the present invention provides an efficient technique for improving the management of mirrored logical volume I/O and synchronization. Mirrors available to have a read/write carried out thereon are selected and their identifiers passed to the logical volume I/O routine, which completes a read by choosing, if necessary, in accordance with conventional criteria. Writes are completed on all active mirrors, including the designated backup mirror, which mirrors are then marked stale.

We have described a particular embodiment of the present invention having a triple mirror system. Obviously, our selection mechanism is applicable to those cases where there are only two, or even more than three, mirror copies of a logical volume. Likewise, while our preferred embodiment is described using a particular data processor and operating system, it should be understood that the principles of our invention may be implemented in other environments.

While the present invention has been shown and described with reference to particular embodiments thereof, it will be understood by those skilled in the art that the foregoing and other changes in form and detail may be made therein without departing from the spirit and scope of the present invention.

What is claimed is:

1. A method for selectively accessing active and stale data in a logical volume having a first unique entry point and multiple mirrors, comprising the steps of:

designating one of said multiple mirrors as a backup mirror;

providing a second entry point, different from said first unique entry point, to said logical volume for the mirror so designated;

selecting any of said multiple mirrors for access as a function of whether its data is stale and the entry point accompanying an access request;

reading from any non stale mirrors of said multiple mirrors when the entry point supplied is said first unique entry point;

reading only from said designated backup when the entry point supplied is said second entry point and said designated backup is stale;

reading from any of said multiple mirrors when said second entry point is supplied and said designated backup is active; and when write access is requested, marking said designated backup stale before writing thereto when said second entry point is supplied.

2. A multiply mirrored logical volume management system having plural mirror copies of a logical volume, said copies capable of containing data in active and stale states, including:

means for assigning first and second unique entry points to said logical volume for use independently by a user selectively requesting access to said logical volume;

means for designating, at user option, any one of said multiple mirrors as a static backup copy;

means for associating said second unique entry point with said static backup copy;

means for choosing a particular mirror copy for access as a function of data state therein and the entry point used in the access request; said means for choosing comprising:

software means for indicating the availability of mirror copies for read access by:

picking any active mirror when said first entry point is used;

picking any active mirror when said second entry point is used and said static backup copy is active; and picking only said static backup mirror when said second entry point is used and said static backup is stale.

3. A multiply mirrored logical volume management system having plural mirror copies of a logical volume, said copies capable of containing data in active and stale states, including:

means for assigning first and second unique entry points to said logical volume for use independently by a user selectively requesting access to said logical volume;

means for designating, at user option, any one of said multiple mirrors as a static backup copy;

means for associating said second unique entry point with said static backup copy;

means for choosing a particular mirror copy for access as a function of data state therein and the entry point used in the access request;

means for choosing any active mirror for write access except said static backup copy when said first entry point is used; and means for choosing only said static backup for write access when said second entry point is used.

4. A computer program having data structures included on a computer readable medium which manipulates multiply mirrored logical volumes in an environment having plural mirror copies of a logical volume, said copies capable of containing data in active and stale stales, including:

means for assigning first and second unique entry points to said logical volume for use independently by a user selectively requesting access to said logical volume;

means for designating, at user option, any one of said multiple mirrors as a static backup copy;

means for associating said second unique entry point with said static backup copy;

means for choosing a particular mirror copy for access as a function of data state therein and the entry point used in the access request, said means for choosing comprising:

means for indicating the availability of mirror copies for read access by
      picking any active mirror when said first entry point is used;
      picking any active mirror when said second entry point is used and said static backup copy is active; and
      picking only said static backup mirror when said second entry point is used and said static backup is stale.

5. A computer program having data structures included on a computer readable medium which manipulates multiply mirrored logical volumes in an environment having plural mirror copies of a logical volume, said copies capable of containing data in active and stale stales, including:

means for assigning first and second unique entry points to said logical volume for use independently by a user selectively requesting access to said logical volume;

means for designating, at user option, any one of said multiple mirrors as a static backup copy;

means for associating said second unique entry point with said static backup copy;

means for choosing a particular mirror copy for access as a function of data state therein and the entry point used in the access request, said means for choosing comprising:

means for marking said static backup copy stale prior to processing any mirror copy for write access;

means for choosing any active mirror for write access except said static backup copy when said first entry point is used; and means for choosing only said static backup for write access when said second entry point is used.

* * * * *